US006895186B2

(12) United States Patent
Stern

(10) Patent No.: US 6,895,186 B2
(45) Date of Patent: May 17, 2005

(54) SYSTEM FOR ACCESSING A WAVELENGTH-DIVISION-MULTIPLEXED BIDIRECTIONAL OPTICAL FIBER RING NETWORK

(75) Inventor: Thomas E. Stern, Riverdale, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 649 days.

(21) Appl. No.: 09/748,484

(22) Filed: Dec. 27, 2000

(65) Prior Publication Data

US 2002/0080443 A1 Jun. 27, 2002

(51) Int. Cl.$^7$ .......................... H04B 10/00; H04B 14/08
(52) U.S. Cl. ............................. 398/83; 398/45; 398/50; 398/49
(58) Field of Search ............................. 398/83, 79, 45, 398/46, 50, 48, 56

(56) References Cited

U.S. PATENT DOCUMENTS

| | | | | | |
|---|---|---|---|---|---|
| 5,550,818 | A | * | 8/1996 | Brackett et al. ....... | 370/395.51 |
| 5,647,035 | A | * | 7/1997 | Cadeddu et al. .............. | 385/24 |
| 5,717,795 | A | | 2/1998 | Sharma et al. ................ | 385/24 |
| 5,959,749 | A | * | 9/1999 | Danagher et al. ............. | 398/83 |
| 6,061,157 | A | * | 5/2000 | Terahara ....................... | 398/1 |
| 6,204,943 | B1 | * | 3/2001 | Hamel et al. .................. | 398/9 |
| 6,459,516 | B1 | * | 10/2002 | Mizrahi et al. ................ | 398/82 |
| 6,466,341 | B1 | * | 10/2002 | Lumish et al. ................ | 398/82 |
| 6,476,946 | B1 | * | 11/2002 | Bruyere et al. ............... | 398/82 |

FOREIGN PATENT DOCUMENTS

| | | |
|---|---|---|
| EP | 0668674 A2 | 8/1995 |
| EP | 0668674 A3 | 4/1998 |
| WO | 9706614 | 2/1997 |

OTHER PUBLICATIONS

Abdalla et al., "A WDM Ring Architecture Based on Integrated Group–Search Wavelength Add/Drop Multiplexers", International Conference on Telecommunications, Jun. 1998, pp 494–498.

Zhang et al., "An Effective and Comprehensive Solution to Traffic Grooming and Wavelength Assignment i SONET/WDM Rings", Part of SPIE Conference on All–Optical Networking, SPIE vol. 3531, Nov. 1998, pp. 221–232.

Simmons et al., "Quantifying the Benefit of Wavelength Add–Drop in WDM Rings with Distance–Independent and Dependent Traffic", Journal of Lightwave Technology, vol. 17, No. 1, Jan. 1999, pp. 48–57.

Andrew Lord, "SeaMeWe3: a technical perspective", The Institution of Electrical Engineers, pp. 1–6, 1998.

Hamada et al., "WDM four–fiber ring with add/drop acousto–optic tunable filter and 4×4 optical switch", Thursday Afternoon, OFC '97 Technical Digest, pp. 313–314.

(Continued)

*Primary Examiner*—Jason Chan
*Assistant Examiner*—Agustin Bello
(74) *Attorney, Agent, or Firm*—Baker Botts LLP; Manu J. Tejwani

(57) ABSTRACT

A system for accessing a wavelength-division-multiplexed ("WDM"), bidirectional optical fiber ring network having first and second network fibers for carrying WDM signals in opposite directions. The system includes a network node intersecting the first and second fibers of the ring network. The network node is coupled to a network access station through a single pair of access fibers. The network access station has a single array of receiving elements and a single array of transmitting elements. The network node has two wavelengths add drop multiplexers ("WADMs") each having a first input, a second input, a first output and a second output. The WADMs can be each individually set to a bar state or cross state for each one of the wavelengths on the ring network.

4 Claims, 5 Drawing Sheets

OTHER PUBLICATIONS

Keang–Po Ho et al., "TuR System Demonstration", Tuesday Evening, OFC '97 Technical Digest, pp. 90–91.

Simeonidou et al., "Submerged WDM Network Implementation Using All Optical Wavelength Routers", Alcatel Submarine Networks, 1997, pp. 1–5.

Berthelon et al., "Experimental assessment of node cascadability in a reconfigurable survivable WDM ring network", Broadband Optical Networks Proceedings, Aug. 5–7th, 1996.

Perrier et al., "4–channel, 10–Gbit/s capacity self–healing WDM ring network with wavelength add/drop multiplexers", Thursday Morning, OFC '96 Technical Digest, pp. 218–220.

D.T. van Veen et al., "Design of an All–Optical Self–Healing Ring Network and its Interconnection to a Core Transport Network", CTIT Technical Report series, No. 96–44. 1997.

Hunter et al., "Wavelength use in partical re–use optical bus networks", Thursday Afternoon, OFC '98 Technical Digest, pp. 360–361.

Arecco et al., "All–Optical Path Protection in the "Prometeo[1]" Test Bid: An Unidirectional WDM Transparent Self Healing Ring in a Field Environment", pp. 392–393, IEEE 1997.

Shiozawa et al., "Demand Assign Wavelength Division Multiple Access (DA–WDMA) Hybrid Optical Loca Area Network Using Optical Add–Drop Multiplexers", IEICE Trans. Commun., vol. E77–B, No. 2, Feb. 1994, pp184–189.

* cited by examiner

SYSTEM FOR ACCESSING A WAVELENGTH-DIVISION-MULTIPLEXED BIDIRECTIONAL OPTICAL FIBER RING NETWORK

BACKGROUND OF INVENTION

The present invention relates to wavelength-division-multiplexed, bidirectional optical fiber ring networks and, more particularly, to a system for accessing such bidirectional ring networks.

The ring is one of the most useful topologies for communication networks regardless of the underlying network technology. It is simple, easily managed, fault tolerant, and through interconnection, ring networks can serve as basic building blocks for more general network structures. Furthermore, because ring networks have been the preferred topology for "traditional" networks, such as SONET, they provide a natural evolutionary route to more advanced optical networks.

Because of the rapidly growing demand for bandwidth, wavelength division multiplexed ("WDM") purely optical ring networks are currently the focus of much attention. An important need in the emerging WDM optical ring networks is for a cost effective technique for accessing such networks, i.e., connecting a network access station to the ring network. The cost of accessing the ring network includes the cost of the hardware in the ring network switching (add-drop) node, the cost of the fibers in the access link between the node and the network access station, and the cost of the optical transceivers in the network access station. Since this is a cost per network station access, minimization of this cost is important to the economic viability of large ring network architectures.

Referring to FIG. 1, there is shown a schematic diagram of a bidirectional ring network 100 having five network nodes 101 respectively connected to five network access stations ("NASs") 102. The network nodes 101 of the ring network 100 are connected by internodal links, each consisting of a pair of optical fibers 103 and 104 carrying signals in opposite directions.

Turning now to FIG. 2, there is shown a schematic diagram of a known system for accessing a WDM bidirectional ring network in which each NAS 102 is connected to its respective network node 101 through two pairs of optical fibers 201 and 202, and 203 and 204. Because many wavelengths are multiplexed on each fiber, all wavelengths carried on a common fiber must be distinct to avoid interference. In the system of FIG. 2, a respective array of optical transmitters 214 and 216 and a respective array of optical receivers 213 and 215 is attached to each of the four access fibers 201, 202, 203 and 204, with the signals from the transmitter arrays 214 and 216 being "added" to the ring network via one of the two wavelength add drop multiplexers ("WADMs") 207 and 208 in the network node 101, and the signals directed to the receiver arrays 213 and 215 being "dropped" from the ring network in a similar fashion.

The function of each one of the WADMs 207 and 208 is to selectively route signals passing through it according to their wavelengths. Each WADM has two states for each wavelength: the "bar" state, in which a signal having the wavelength entering at its upper input 205 or 219 leaves from its upper output 217 or 221, and a signal having the wavelength entering at its lower input 206 or 220 leaves from its lower output 218 or 222; and the "cross" state, in which a signal having the wavelength entering at its upper input 205 or 219 leaves from its lower output 218 or 222, and a signal having the wavelength entering at its lower input 206 or 220 leaves from its upper output 217 or 221. Accordingly, when both the first WADM 207 and the second WADM 208 of the network node 101 are each in the bar state for a given wavelength on the ring network, a signal having the given wavelength on the internodal fiber 209 entering the network node 101 leaves the network node through internodal fiber 210, and a signal having the given wavelength on internodal fiber 211 entering the network node leaves the network node on internodal fiber 212. If the first WADM 207 is in the bar state for a given wavelength and the second WADM 208 is in the cross state for the given wavelength, a signal having the given wavelength on internodal fiber 209 entering the network node 101 leaves the network node unchanged on internodal fiber 210. However, a signal having the given wavelength on internodal fiber 211 entering the network node is routed to the receiver array 213 through access fiber 201, thereby "dropping" the signal from the L fiber of the ring network, and a signal having the given wavelength provided by the transmitter array 216 through access fiber 204 is routed to the internodal fiber 212 leaving the network node, thereby "adding" the signal to the L fiber. If the first WADM 207 is in the cross state for a given wavelength and the second WADM 208 is in the bar state for the given wavelength, a signal having the given wavelength on internodal fiber 211 entering the network node 101 will pass through the network node unchanged to internodal fiber 212 leaving the network node. But a signal having the given wavelength on internodal fiber 209 entering the network node 101 is routed to receiver array 215 through access fiber 203, thereby dropping the signal routed to the receiver array 215 from the R fiber, and a signal having the given wavelength provided by the transmitter array 214 through access fiber 202 is carried on the internodal fiber 210 leaving the network node, thereby adding the signal provided by the transmitter array 214 to the R fiber.

It is noted that in the ring network access system illustrated in FIG. 2, each access fiber pair 201 and 204, and 202 and 203 connects a transmitter and a receiver to a WADM connected to one of the two unidirectional rings, so that the configuration is equivalent to two completely separate unidirectional ring networks, a clockwise ring (the R fiber) and a counterclockwise ring (the L fiber) with separate associated network access stations each having its own transmitter and receiver. The transmitter typically comprises an appropriate array of transmitting elements (e.g., semiconductor lasers and light emitting diodes) and the receiver typically comprises an appropriate array of receiving elements (e.g., photodiodes). Such a configuration is costly in terms of the number of transmitter arrays and receiver arrays required in the network access station, and in terms of the number of access fibers required to connect to the network node, particularly when the network access station 102 is located a considerable distance away from the network node 101. It would be highly desirable to have access systems for a bidirectional, wavelength-division-multiplexed optical fiber ring network that require fewer components and can therefore be implemented at lower cost.

SUMMARY OF THE INVENTION

In accordance with the present invention, there is provided a system for accessing a WDM bidirectional optical fiber ring network having a first network fiber for carrying up to W WDM signals in a first direction, the signals on the first network fiber having respective ones of W distinct wavelengths, and a second network optical fiber for carrying up to W WDM signals in a second direction, the signals on the second network fiber having respective ones of the W distinct wavelengths, where W is a positive integer of arbitrary magnitude. The system comprises a network access station having a single transmitter for providing signals having respective ones of the W distinct wavelengths and a single receiver for receiving signals having respective ones of the W distinct wavelengths, and a network node interposed in the paths of the first and second network fibers and coupled to the transmitter of the network access station through transmitter access fiber means and coupled to the receiver of the network access station through receiver access fiber means. Each of the transmitter access fiber means and the receiver access fiber means are for carrying up to W signals having respective ones of the W wavelengths.

The network node comprises a first and a second WADM, each having a first input, a second input, a first output and a second output. The first input of the first WADM is coupled to the transmitter access fiber means, and the second input of the first WADM is coupled to the first network fiber entering the network node. The first output of the first WADM is coupled to the first input of the second WADM, and the second output of the first WADM is coupled to the first network fiber leaving the network node. The second input of the second WADM is coupled to the second network fiber entering the network node, and the first output of the second WADM is coupled to the receiver access fiber means. The second output of the second WADM is coupled to the second network fiber leaving the network node.

Each of the first and second WADMs has for each one of the W distinct wavelengths, $\lambda$, a bar state, in which a signal having the wavelength $\lambda$ received by the first input is provided at the first output, and a signal having the wavelength $\lambda$ received by the second input is provided at the second output. Each one of the first and second WADMs has for each one of the W distinct wavelengths, $\lambda$, a cross state, in which a signal having the wavelength $\lambda$ received by the first input is provided at the second output and a signal having the wavelength $\lambda$ received at the second input is provided at the first output. For each one of the W wavelengths, $\lambda$, at which both the first and second WADMs are in the bar state, signals having the wavelength $\lambda$ on the first or second network fiber will pass through the network node undisturbed. For each one of the W wavelengths, $\lambda$, at which the first WADM is in the bar state and the second WADM is in the cross state, a signal having the wavelength $\lambda$ on the first network optical fiber entering the network node passes through the network node undisturbed to the first network fiber leaving the network node. However, a signal having the wavelength $\lambda$ on the second network optical fiber entering the network node is routed to the receiver of the network access station through the receiver access fiber means, and a signal having the wavelength $\lambda$ provided by the transmitter of the network access station is routed through the transmitter access fiber means to the second network fiber leaving the network node. For each one of the W wavelengths, $\lambda$, at which the first WADM is in the cross state and the second WADM is in the bar state, a signal having the wavelength $\lambda$ on the second network fiber entering the network node will pass through the network node undisturbed to the second network fiber leaving the network node. But a signal having the wavelength $\lambda$ on the first network fiber entering the network node is routed to the receiver of the network access station through the receiver access fiber means, and a signal having the wavelength $\lambda$ provided by the transmitter of the network access station is routed through the transmitter access fiber means to the first network fiber leaving the network node.

In a first exemplary embodiment of the present invention, the transmitter of the network access station typically comprises an appropriate array of transmitting elements (e.g., semiconductor lasers and light emitting diodes) for providing signals having respective ones of the W wavelengths, and the receiver of the network access station typically comprises an appropriate array of receiving elements (e.g., photodiodes) for detecting signals having respective ones of the W wavelengths. The transmitter access fiber means and the receiver access fiber means each comprise a single fiber for carrying up to W WDM signals having respective ones of the W wavelengths. Each one of the first and second WADMs comprise a 2×2 multiwavelength switch capable of being set to the bar state or the cross state for each one of the W wavelengths.

In yet another exemplary embodiment of the present invention, the transmitter of the network access station comprises an array of transmitting elements for providing signals having respective ones of the W wavelengths, and the receiver of the network access station comprises an array of receiving elements for detecting signals having respective ones of the W wavelengths. The transmitter access fiber means and the receiver access fiber means each comprise a single fiber for carrying up to W WDM signals having respective ones of the W wavelengths. The first WADM comprises a first wavelength division demultiplexer having an input coupled to receive WDM signals carried by the first network fiber entering the network node and W single-wavelength outputs corresponding to respective ones of the W wavelengths. Individual ones of the W outputs carry demultiplexed ones of the WDM signals on the first network fiber entering the network node. The first WADM further comprises a first group of W switches corresponding to respective ones of the W wavelengths. Each one of the first group of W switches has a first input, a second input, a first output and a second output. Each one of the first group of W switches has a bar state, in which a signal received at the first or the second input of the switch is provided at the first or the second output of the switch, respectively. Each one of the first group of W switches has a cross state, in which a signal received at the first or the second input of the switch is provided at the second or the first output of the switch, respectively. In addition, the first WADM includes a first wavelength division multiplexer having W single-wavelength inputs corresponding to respective ones of the W wavelengths, and an output coupled to provide WDM signals corresponding to the single-wavelength signals received at respective ones of the W inputs on the first network fiber leaving the network node. The first WADM also includes a transmitter wavelength division demultiplexer having an input coupled to receive WDM signals carried by the transmitter access fiber and W single-wavelength outputs corresponding to respective ones of the W wavelengths, individual ones of the W outputs of the transmitter wavelength division demultiplexer carrying demultiplexed ones of the WDM signals on the transmitter access fiber. The first input of each one of the first group of W switches is coupled to a respective one of the W single-wavelength outputs of the transmitter wavelength division demultiplexer corresponding to the same wavelength as the switch to which the transmitter demultiplexer output is coupled, and the second input of each one of the first group of W switches is coupled to a respective one of the W single-wavelength outputs of the first wavelength division demultiplexer corresponding to the same wavelength as the switch to which the first demultiplexer output is coupled. The second output of each one of the first group of W switches is coupled to a respective one of the W inputs of the first wavelength division multiplexer corresponding to the same wavelength as the switch to which the first multiplexer output is coupled. The input of the transmitter wavelength division demultiplexer is the first input of the first WADM, and the input of the first wavelength division demultiplexer is the second input of the first WADM. The first outputs of the first group of W switches are collectively the first output of the first WADM, and the output of the first wavelength division multiplexer is the second output of the first WADM.

The second WADM includes a second wavelength division demultiplexer having an input coupled to receive WDM signals carried by the second network fiber entering the network node, and having W single-wavelength outputs each corresponding to a different one of the W wavelengths, individual ones of the W single-wavelength outputs providing demultiplexed ones of WDM signals carried on the second network fiber entering the network node. The second WADM further comprises a second group of W switches corresponding to respective ones of the W wavelengths and each having a first input, a second input, a first output and a second output. Each one of the second group of W switches has a bar state, in which a signal received at the first or the second input of the switch is provided at the first or the second output of the switch, respectively. Each one of the second group of W switches has a cross state, in which a signal received at the first or second input of the switch is provided at the second or the first output of the switch, respectively. The second WADM also comprises a receiver wavelength division multiplexer having W single-wavelength inputs corresponding to respective ones of the W wavelengths, and an output coupled to provide on the receiver access fiber WDM signals corresponding to signals received by respective ones of the W single-wavelength inputs. In addition, the second WADM includes a second wavelength division multiplexer having W single-wavelength inputs corresponding to respective ones of the W wavelengths, and an output coupled to provide on the second network fiber leaving the network node WDM signals corresponding to the signals received by respective ones of the W single-wavelength inputs. The first inputs of the second group of W switches are collectively the first input of the second WADM, and the input of the second wavelength division demultiplexer is the second input of the second WADM. The first input of each one of the second group of W switches is coupled to the output of a respective one of the first group of W switches corresponding to the same wavelength and the second input of each one of the second group of W switches is connected to a respective one of the W single-wavelength outputs corresponding to the same wavelength as the switch to which the second wavelength division demultiplexer output is coupled. The first output of each one of the second group of W switches is coupled to a respective one of the W single-wavelength inputs of the receiver wavelength division multiplexer corresponding to the same wavelength as the switch whose output is coupled to the receiver multiplexer, and the second output of each one of the second group of W switches is coupled to a respective one of the W single-wavelength inputs of the second wavelength division multiplexer corresponding to the same wavelength as the switch whose second output is coupled to the second wavelength division multiplexer input. The output of the receiver wavelength division multiplexer is the first output of the second WADM, and the output of the second wavelength division multiplexer is the second output of the second WADM.

For each one of the first group of W switches corresponding to a respective one of the W wavelengths, $\lambda$, and an individual respective one of the second group of W switches corresponding to the same wavelength $\lambda$ being both in the bar state, signals having the wavelength $\lambda$ on the first or the second network fiber entering the network node pass through the network node unchanged to the first or second network fiber leaving the network node, respectively. For each one of the first group of W switches corresponding to a respective one of the W wavelengths, $\lambda$, being in the cross state, and an individual one of the second group of W switches corresponding to the same wavelength $\lambda$ being in the bar state, a signal having the wavelength $\lambda$ on the second network fiber entering the network node passes through the network node unchanged to the second network fiber leaving the network node, while a signal having the wavelength $\lambda$ on the first network fiber entering the network node is routed to the array of receiving elements in the network access station. At the same time a signal having the wavelength $\lambda$ provided by the array of transmitting elements in the network access station is routed to the first network fiber leaving the network node. For each one of the first group of W switches corresponding to a respective one of the W wavelengths, $\lambda$, being in the bar state, and an individual one of the second group of W switches corresponding to the same wavelength $\lambda$ being in the cross state, a signal having the wavelength $\lambda$ on the first network fiber entering the network node passes through the network node unchanged to the first network fiber leaving the network node, while a signal having the wavelength $\lambda$ on the second network fiber entering the network node is routed to the array of receiving elements in the network access station. At the same time a signal having the wavelength $\lambda$ provided by the array of transmitting elements in the network access station is routed to the second network fiber leaving the network node.

In accordance with a further exemplary embodiment of the present invention, the receiver of the network access station comprises W individual receiving elements each one for receiving a signal having a respective one of the W wavelengths, and the transmitter of the network access station comprises W individual transmitting elements, each one for providing signals having a respective one of the W wavelengths. The receiver access fiber means comprises W fibers each one corresponding to a respective one of the W wavelengths and being coupled to an individual one of the receiving elements for receiving signals having the corresponding wavelength, and the transmitter access fiber means comprises W fibers each one corresponding to a respective one of the W wavelengths and being coupled to an individual one of the transmitting elements for providing signals having the corresponding wavelength. The first WADM comprises a first wavelength division demultiplexer having an input coupled to receive WDM signals on the first network fiber entering the network node and having W single-wavelength outputs corresponding to respective ones of the W wavelengths, individual ones of the W single-wavelength outputs providing demultiplexed ones of WDM signals on the first network fiber entering the network nodes, the input of the first wavelength division demultiplexer being the second input of the first WADM. The first WADM further comprises a first group of W switches corresponding to respective ones of the W wavelengths, each having a first input, a second input, a first output and a second output. Each one of the first group of W switches having a bar state, in which a signal received by the first or the second input of the switch is provided at the first or the second output of the switch, respectively, and a cross state, in which a signal received by the first or the second input of the switch is provided at the second or the first output of the switch, respectively. In addition, the first WADM includes a first wavelength division multiplexer having W single-wavelength inputs corresponding to respective ones of the W wavelengths, and an output coupled to provide on the first network fiber leaving the network node WDM signals corresponding to signals received by respective ones of the W single-wavelength inputs, the output of the first wavelength division multiplexer being the second output of the first WADM. The first input of each one of the first group of W switches is coupled to a respective one of the W transmitter access fibers corresponding to the same wavelength as the switch to which the transmitter access fiber is coupled, the first inputs of the first group of W switches being collectively the first input of the first WADM. The second input of each one of the first group of W switches is coupled to a respective one of the W single-wavelength outputs of the first wavelength division demultiplexer corresponding to the same wavelength as the switch to which the first demultiplexer output is coupled. The second output of each one of the first group of W switches is coupled to a respective one of the W single-wavelength inputs of the first wavelength division multiplexer corresponding to the same wavelength as the switch to which the first multiplexer input is coupled.

The second WADM comprises a second wavelength division demultiplexer having an input coupled to receive WDM signals on the second network fiber entering the network node and having W single-wavelength outputs each one corresponding to a respective one of the W wavelengths. Individual ones of the W single-wavelength outputs provide demultiplexed ones of WDM signals received by the input of the second wavelength division demultiplexer, the input of the second wavelength division demultiplexer being the second input of the second WADM. In addition, the second WADM includes a second group of W switches, each one corresponding to a respective one of the W wavelengths and having a first input, a second input, a first output and a second output. Each one of the second group of W switches has a bar state, in which a signal received at the first or the second input of the switch is provided at the first or the second output of the switch, respectively. Each one of the second group of W switches has a cross state, in which a signal received at the first or the second input of the switch is provided at the second or the first output of the switch, respectively. The second WADM further comprises a second wavelength division multiplexer having W single-wavelength inputs each corresponding to a respective one of the W wavelengths, and an output coupled to provide on the second network fiber leaving the network node WDM signals corresponding to signals received by respective ones of the W single-wavelength inputs, the output of the second wavelength division multiplexer being the second output of the second WADM. The first input of each one of the second group of W switches is coupled to the first output of a respective one of the first group of W switches of the first WADM corresponding to the same wavelength, the first outputs of the first group of W switches being collectively the first output of the first WADM and the first inputs of the second group of W switches being collectively the first input of the second WADM. The second input of each one of the second group of W switches is coupled to a respective one of the W single-wavelength outputs of the second wavelength division demultiplexer corresponding to the same wavelength as the switch to which the respective one of the second wavelength division demultiplexer is coupled. The first output of each one of the second group of W switches is coupled to a respective one of the receiver access fibers corresponding to the same wavelength as the switch to which the receiver access fiber is coupled, the first outputs of the second group of W switches being collectively the first output of the second WADM. The second output of each one of the second group of W switches is coupled to a respective one of the W single-wavelength inputs of the second wavelength division multiplexer corresponding to the same wavelength as the switch to which the second multiplexer input is coupled.

For each one of the first group of W switches corresponding to a respective one of the W wavelengths, $\lambda$, and an individual one of the second group of W switches corresponding to the same wavelength $\lambda$ both being in the bar state, a signal having the wavelength $\lambda$ on the first network fiber or the second network fiber entering the network node passes through the network node unchanged to the first network fiber or the second network fiber leaving the network node, respectively. For each one of the first group of W switches corresponding to a respective one of the W wavelengths, $\lambda$, being in the bar state and an individual one of the second group of W switches corresponding to the same wavelength $\lambda$ being in the cross state, a signal having the wavelength $\lambda$ on the first network fiber entering the network node passes through the network node unchanged to the first network fiber leaving the network node. However, a signal having the wavelength $\lambda$ on the second network optical fiber entering the network node is routed to a respective one of the receiving elements in the network access station, and a signal having the wavelength $\lambda$ provided by a respective one of the transmitting elements in the network access station is routed to the second network fiber leaving the network node. For each one of the first group of W switches corresponding to a respective one of the W wavelengths, $\lambda$, being in the cross state and an individual one of the second group of W switches corresponding to the same wavelength $\lambda$ being in the bar state, a signal having the wavelength $\lambda$ on the second network fiber entering the network node passes through the network node unchanged to the second network fiber leaving the network node. However, a signal having the wavelength $\lambda$ on the first network fiber entering the network node is routed to a respective one of the receiving elements in the network access station, and a signal having the wavelength $\lambda$ provided by a respective one of the transmitting elements in the network access station is routed to the first network fiber leaving the network node.

BRIEF DESCRIPTION OF THE DRAWINGS

For a more complete understanding of the nature and benefits of the present invention, reference is made to the following detailed description of exemplary embodiments thereof taken in conjunction with the accompanying drawings, in which.

Throughout the figures of the drawings, the same reference numerals and characters are used to designate common components, features and elements.

DETAILED DESCRIPTION

Figure 1:
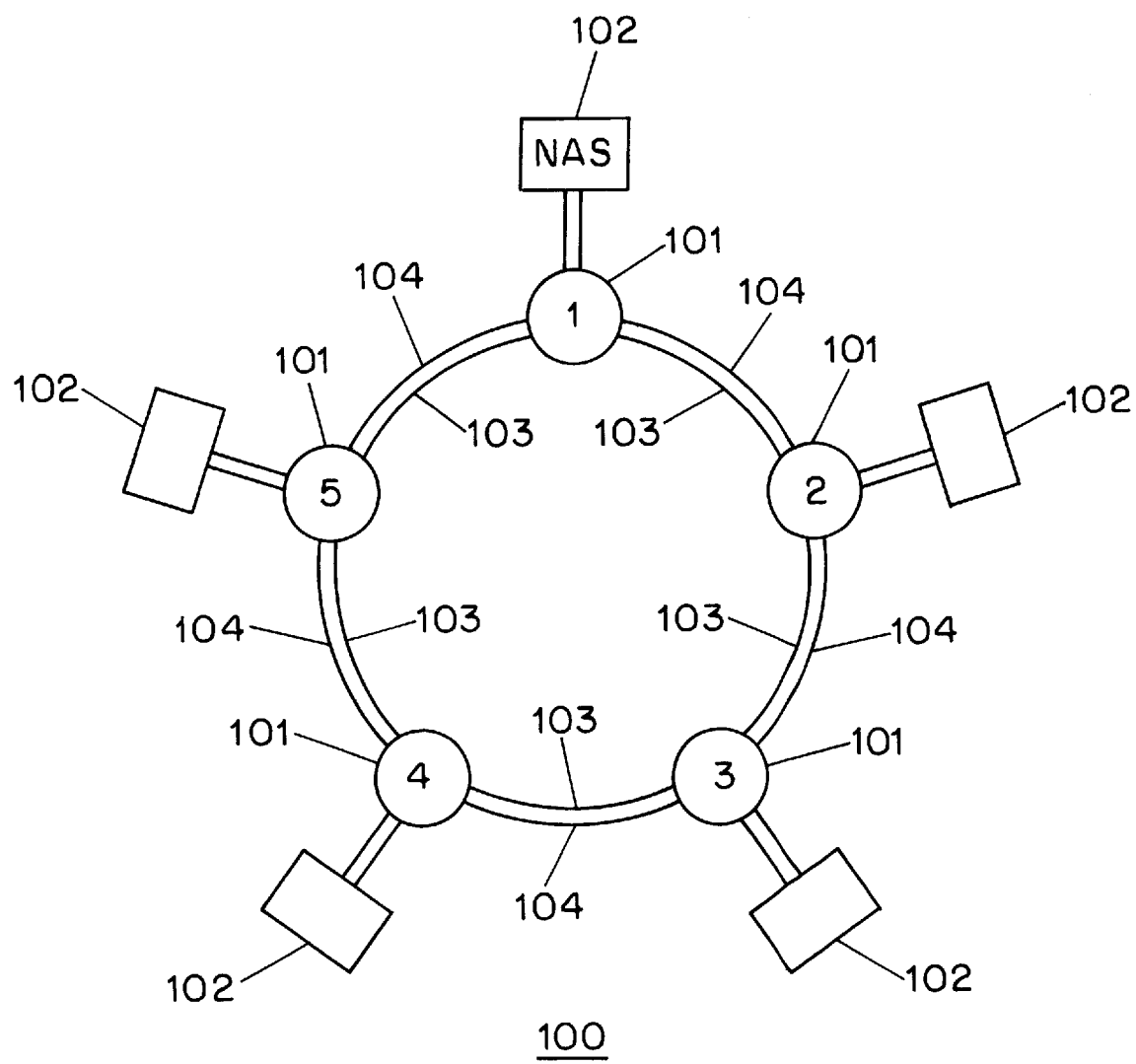
FIG. 1 is a schematic diagram of a wavelength-division-multiplexed, bidirectional optical fiber ring network having five network nodes and a network access station associated with each one of the network nodes.
Figure 2:
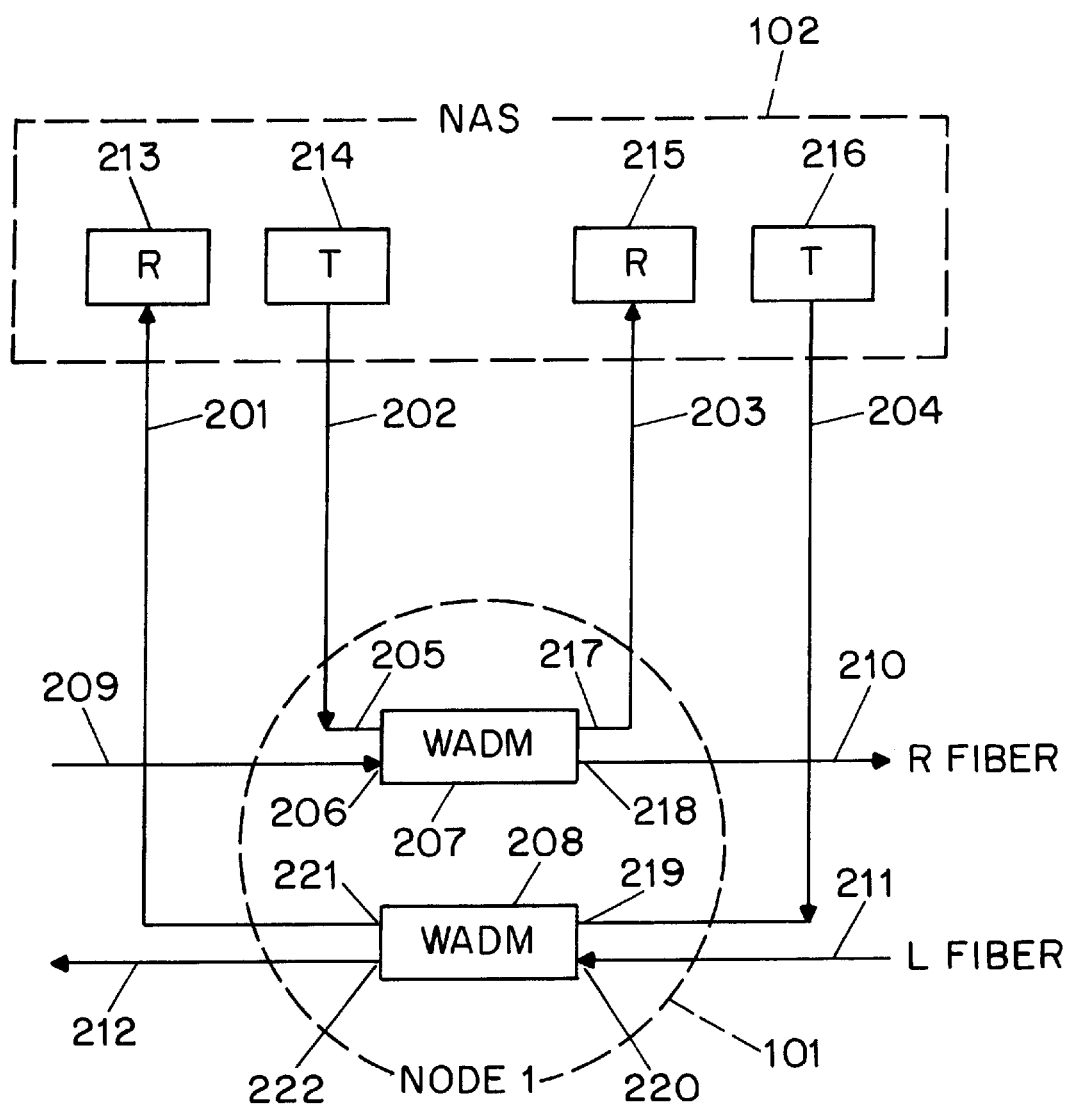
FIG. 2 is a schematic diagram of a prior art system for accessing a wavelength-division-multiplexed, bidirectional optical fiber ring network, in which the network access station has two receiver/transmitter pairs and is coupled to the associated network node through two pairs of access fibers.
Figure 3:
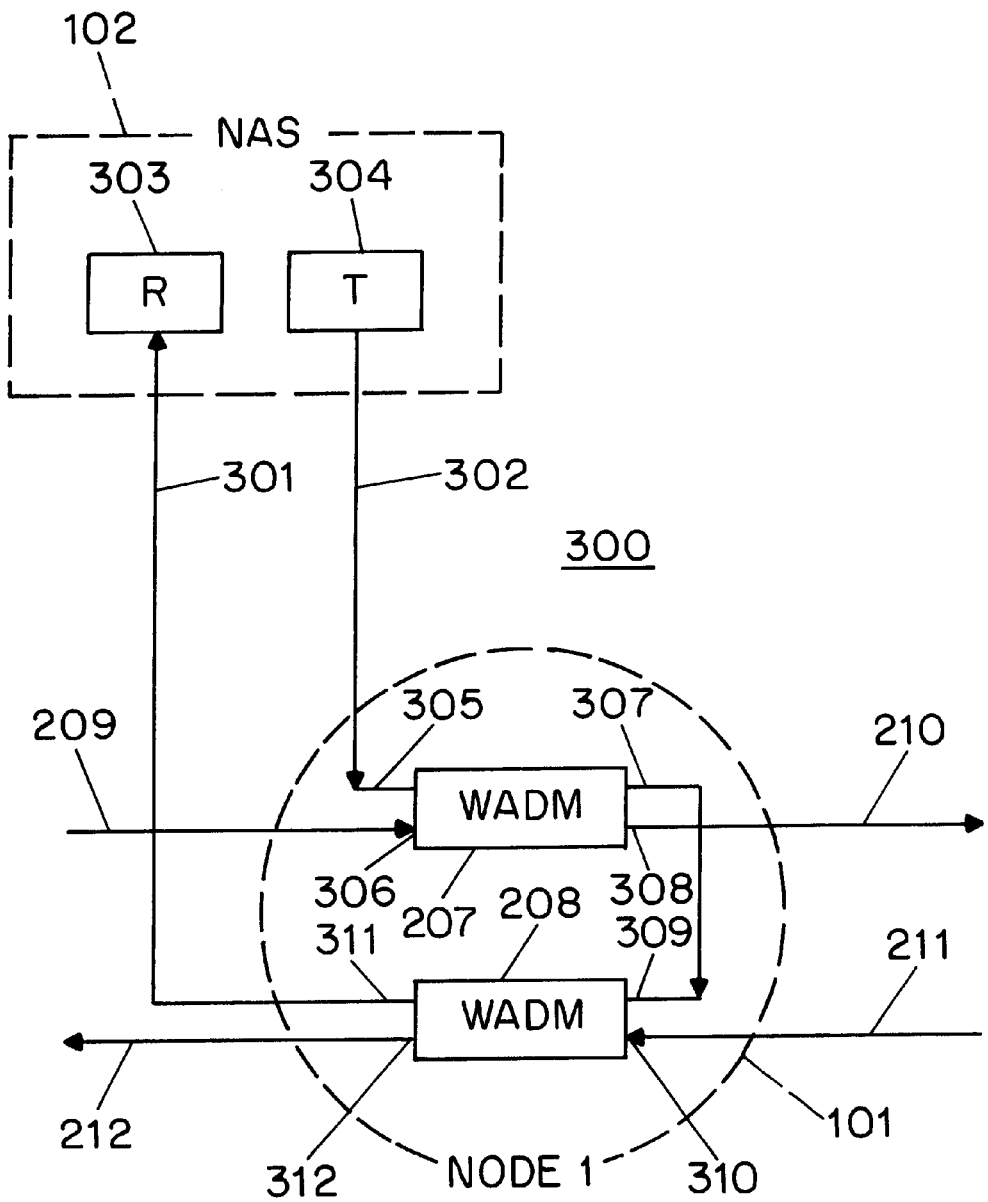
FIG. 3 is a schematic diagram depicting a system for accessing a wavelength-division-multiplexed, bidirectional optical fiber ring network in accordance with the present invention, where the network access station has a single receiver/transmitter pair and is coupled to the associated network access node through a single pair of access fibers.

Referring to FIG. 3, there is shown a schematic diagram depicting a system 300 for accessing a wavelength-division-multiplexed, bidirectional optical fiber ring network in accordance with the present invention. The apparatus includes a network node 101, which intersects the two network optical fibers, 103 and 104 in FIG. 1, that carry signals in opposite directions, such that each network optical fiber has a segment 209 and 211 entering the network node 101, and a segment 210 and 212 leaving the network node. The network node 101 is coupled to a network access station 102 through a single pair of access fibers 301 and 302. The network access station 102 has a single receiver 303 and a single transmitter 304 coupled to the network node through a receiver access fiber 301 and a transmitter access fiber 302, respectively. The network node 101 has two WADMs 207 and 208, each having a first input 305 and 309, respectively, a second input 306 and 310, respectively, a first output 307 and 311, respectively, and a second output 308 and 312, respectively. The first input 305 of the first WADM 207 is coupled to receive WDM signals on the transmitter access fiber 302, and the second input of the first WADM 207 is coupled to receive WDM signals on the segment of the first network optical fiber 209 entering the network node 101. The first output 307 of the first WADM 207 is coupled to the first input 309 of the second WADM 208, and the second output 308 of the first WADM 207 is coupled to provide WDM signals on the segment of the first optical fiber 210 leaving the network node 101. The second input 310 of the second WADM 208 is coupled to receive WDM signals on the segment of the second network optical fiber 211 entering the network node 101, and the first output 311 of the second WADM 208 is coupled to provide WDM signals on the receiver access fiber 301. The second output 312 of the second WADM 208 is coupled to provide WDM signals on the segment of the second network optical fiber 212 leaving the network node 101.

Each one of the first and second network optical fibers are for carrying up to W signals having respective ones of W distinct wavelengths, where W is a positive integer of arbitrary magnitude. For each one of the W wavelengths, $\lambda$, on the ring network, where $\lambda$ is an arbitrary one of the W wavelengths, each of the first and second WADMs 207 and 208 of the network node 101 has a "bar" state, in which a signal having the wavelength $\lambda$ received at the first input 305 and 309, respectively, is provided to the first output 307 and 311, respectively, and a signal having wavelength $\lambda$ received at the second input 306 and 310, respectively, is provided at the second output 308 and 312, respectively. For each one of the W wavelengths, $\lambda$, on the ring network, each one of the first and second WADMs 207 and 208 of the network node 101 has a "cross" state, in which a signal having wavelength $\lambda$ received at the first input 305 and 309 is provided at the second output 308 and 312, respectively, and a signal having wavelength $\lambda$ received at the second input 306 and 310, respectively, is provided at the first output 307 and 311, respectively. Accordingly, if the first WADM 207 is in the bar state for signals having wavelength $\lambda$, and the second WADM 208 is in the cross state for signals having wavelength $\lambda$, a signal having wavelength $\lambda$ on the segment of the first network optical fiber 209 entering the network node 101 passes through the network node undisturbed to the segment of the first network optical fiber 210 leaving the network node. However, a signal having wavelength $\lambda$ on the segment of the second network optical fiber 211 entering the network node 101 is received by the second input 310 of the second WADM 208 and routed through the first output 311 of the second WADM 208 and the receiver access fiber 301 to the receiver 303 of the network access station 102. At the same time a signal having wavelength $\lambda$ provided by the transmitter 304 of the network access station 102 is routed via the transmitter access fiber 302 to the first input 305 of the first WADM 207, provided at the first output 307 of the first WADM 207, received by the first input 309 of the second WADM 208, and provided at the second output 312 of the second WADM 208 to the segment of the second network optical fiber 212 leaving the network node 101. In this manner, the signal having wavelength $\lambda$ on the segment of the second network optical fiber 211 entering the network node 101 is "dropped" by being routed to the receiver 303 of the network access station 102, and a signal having wavelength $\lambda$ provided by the transmitter 304 of the network access station is "added" to the segment of the second optical fiber 212 leaving the network node.

If on the other hand for wavelength $\lambda$ the first WADM 207 is in the cross state and the second WADM 208 is in the bar state, a signal having wavelength $\lambda$ on the segment of the second network optical fiber 211 entering the network node 101 is received by the first input 310 of the second WADM 208 and provided at the second output 312 thereof to the segment of the second network optical fiber 212 leaving the network node 101. But a signal having wavelength $\lambda$ on the segment of the first network optical fiber 209 entering the network node 101 is received by the second input 306 of the first WADM 207, provided at the first output 307 thereof, received by the first input 309 of the second WADM 208 and provided at the first output 311 thereof to the receiver access fiber 301, and received by the receiver 303 of the network access station 102. At the same time a signal having wavelength $\lambda$ provided by the transmitter 304 of the network access station 102 is carried on the transmitter access fiber 302 to the first input 305 of the first WADM 207 and provided at the second output 308 thereof to the segment of the first network optical fiber 210 leaving the network node. Thus, a signal having wavelength $\lambda$ carried by the segment of the first network optical fiber 209 entering the network node 101 is routed to the receiver 303 of the network access station and is thereby dropped from the first network optical fiber, and a signal having wavelength $\lambda$ provided by the transmitter 304 of the network access station is routed to the segment of the first network optical fiber 210 leaving the network node 101 and is thereby added to the first network optical fiber.

A number of structures and technologies for fabricating WADMs suitable for use in the network node 101 of FIG. 3 are known in the art. Two approaches that are commonly employed are: 1) using a 2×2 multiwavelength (i.e., wavelength selective) switch for each WADM; and 2) using a combination of 2×2 switches, which are not wavelength selective, and wavelength division multiplexers and demultiplexers. While the switches in either of the two approaches are normally electrically controllable, in some cases "hard-wired" connections, which provide essentially fixed WADMs may be sufficient. Typical examples of multiwavelength switches suitable for use in the ring network access system of FIG. 3 are the acoustically-tunable optical filter (ATOF), as described, for example, in D. A. Smith et al., "Integrated-Optic Acoustically-Tunable Filters for WADM Networks," IEEE Journal on Selected Areas in Communications, Vol. 8, No. 6, pp. 1151–1159, August 1990, and the liquid crystal multiwavelength switch, as described, for example, in J. S. Patel et al., "Liquid Crystal and Grating-Based Multiple-Wavelength Cross-Connect Switch," IEEE Photonics Technology Letters, Vol. 2, No. 5, pp. 514–516, May 1995. Both the D. A. Smith et al. and the J. S. Patel et al. articles are incorporated herein by reference. When the devices described in these articles are used as the 2 input by 2 output WADMs 207 and 208 of the network node 101 of FIG. 3, the network node 101 performs the add-drop function selectively and independently on each wavelength in response to external electronic control (not shown). Because the ring network access system of FIG. 3 requires only a single receiver 303 and a single transmitter 304 in the network access station 102, and coupling to the network node 101 through only a single pair of access fibers 301 and 302, the ring network access system in accordance with the present invention requires fewer components and is therefore less costly to build than the ring network access system of the prior art. This is particularly true where the network access station is located some distance away from the network node so as to require access fibers of relatively long lengths.

Figure 4:
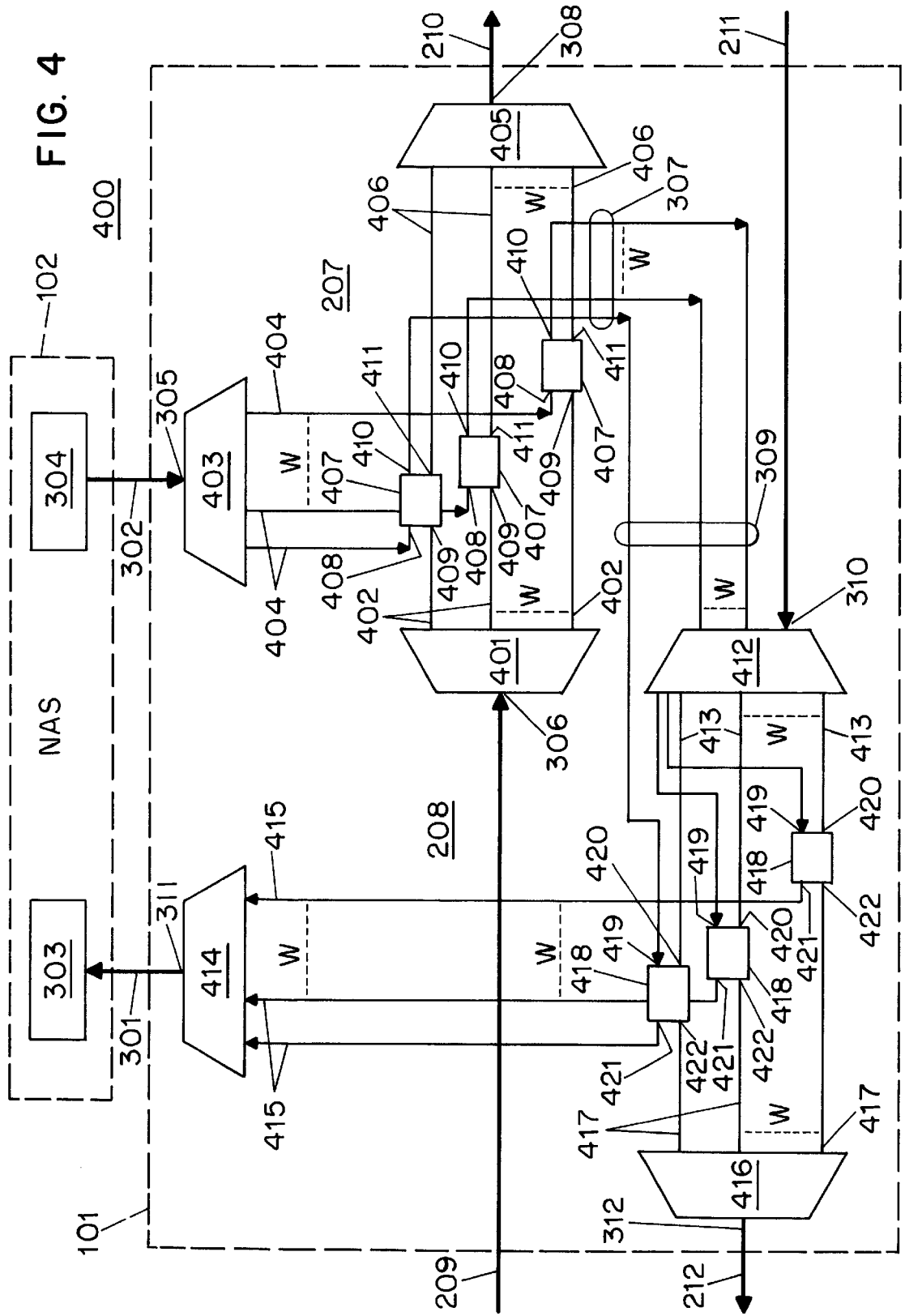
FIG. 4 is a schematic diagram of an implementation of the system of FIG. 3 according to an exemplary embodiment of the present invention.

Turning now to FIG. 4, there is shown an implementation of a system 400 for accessing a wavelength-division-multiplexed, bidirectional optical fiber ring network in accordance with another exemplary embodiment of the present invention. The system 400 includes a network access station 102 having a single receiver 303 and a single transmitter 304 which are coupled to the network node through a single receiver access fiber 301 and a single transmitter access fiber 302. In the example depicted in FIG. 4, the ring network carries up to W signals each having a respective one of W distinct wavelengths, where W is a positive integer of arbitrary magnitude. The receiver 303 in the network access station 102 is advantageously an integrated array of receiving elements (e.g., semiconductor photodiodes) capable of separately detecting signals having each one of the W distinct wavelengths on the ring network, and the transmitter 304 of the network access station is advantageously an integrated array of transmitting elements (e.g., semiconductor lasers) capable of separately providing up to W signals each having a respective one of the W distinct wavelengths on the ring network. Integrated receiving element arrays suitable for use as the receiver 303 in the network access station 102 of FIG. 4 are known in the art and described, for example, in C. -S. Li et al., "Variable Bit-Rate Receiver for WDMA/WDM Systems," IEEE Photonics Technology Letters, Vol. 9, No. 8, pp. 1158–1160, August 1997. Likewise, integrated transmitting element arrays suitable for use as the transmitter 304 in the network access station 102 of FIG. 4 are known in the art and described, for example, in J. B. D. Soole et al., "Multiwavelength Semiconductor Lasers Advanced Rapidly," Laser Focus World, pp. S9–S13, June 1994. Both the C. -S. Li et al. article and the J. B. D. Soole et al. article are incorporated herein by reference.

The receiver access fiber 301 and the transmitter access fiber 302 are each capable of carrying up to W WDM signals having respective ones of the W wavelengths. The network node 101 has a first WADM 207 and a second WADM 208 interconnected in the manner shown in FIG. 3. The first WADM comprises a first wavelength division demultiplexer 401 having an input 306 coupled to receive WDM on the segment of the first network optical fiber 209 entering the network node 101, and having W single-wavelength outputs 402. The first wavelength division demultiplexer 401 demultiplexes the WDM signals on the segment of the first network optical fiber 209 entering the network node 101 and provides each one of the demultiplexed signals at a respective one of the outputs 402 corresponding to the wavelength of the demultiplexed signal provided at the respective one of the output. The input 306 of the first wavelength division demultiplexer 401 is the second input of the first WADM 207. The first WADM also includes a transmitter wavelength division demultiplexer 403 having an input 305 coupled to the transmitter access fiber 302 and having W single-wavelength outputs 404, each corresponding to a respective one of the W wavelengths. The transmitter wavelength division demultiplexer 403 demultiplexes WDM signals on the transmitter access fiber 302 and provides each one of the demultiplexed signals at a respective one of the outputs 404 corresponding to the wavelength of the demultiplexed signal provided at the respective one of the outputs. The input 305 of the transmitter wavelength division demultiplexer 403 is the first input of the first WADM 207. In addition, the first WADM includes a first wavelength division multiplexer 405 having W single-wavelength inputs 406, each corresponding to a respective one of the W wavelengths, and an output 308 coupled to the segment of the first network optical fiber 210 leaving the network node 101. The first wavelength division multiplexer 405 multiplexes single-wavelength signals received at respective ones of the single-wavelength inputs 406 and provides corresponding WDM signals to the segment of the first network optical fiber 210 leaving the network node 101, the output 308 of the first wavelength division multiplexer 405 being the second output of the first WADM 207. The first WADM further comprises a first group of W 2×2 non-wavelength-selective switches 407, each corresponding to a respective one of the W wavelengths. Each one of the first group of switches 407 has a first input 408, a second input 409, a first output 410 and a second output 411. Each one of the first group of switches 407 has a bar state in which a signal received by its first input 408 is provided at its first output 410, and a signal received by its second input 409 is provided at its second output 411. Moreover, each one of the first group of switches 407 has a cross state, in which a signal received by its first input 408 is provided at its second output 411, and a signal received by its second input 409 is provided at its first output 410. The first input 408 of each one of the first group of switches 407 is coupled to a respective one of the single-wavelength outputs 404 of the transmitter wavelength division demultiplexer 403 corresponding to the same wavelength as the switch coupled thereto. The second input 409 of each one of the first group of switches 407 is coupled to a respective one of the single-wavelength outputs 402 of the first wavelength division demultiplexer 401 corresponding to the same wavelength as the switch coupled thereto. The second output 411 of each one of the first group of switches 407 is coupled to a respective one of the single-wavelength inputs 406 of the first wavelength division multiplexer 405 corresponding to the same wavelength as the switch coupled thereto. The first outputs 410 of the first group of switches 407 are collectively the first output of the first WADM 207.

The second WADM 208 has a second wavelength division demultiplexer 412 having an input 310 coupled to the segment of the second network optical fiber 211 entering the network node 101, and W single-wavelength outputs 413 each corresponding to a respective one of the W wavelengths. The second wavelength division demultiplexer 412 demultiplexes WDM signals on the segment of the second network optical fiber 211 entering the network node 101 and provides each one of the demultiplexed signals at a respective one of the outputs 413 corresponding to the wavelength of the demultiplexed signal provided thereat. The input 310 of the second wavelength division demultiplexer 310 is the second input of the second WADM 208. In addition, the second WADM includes a receiver wavelength division multiplexer 414 having W single-wavelength inputs 415 each corresponding to a respective one of the W wavelengths, and an output 311 coupled to the receiver access fiber 301. The receiver wavelength division multiplexer multiplexes signals received by the single-wavelength inputs 415 to provide corresponding WDM signals on the receiver access fiber 301, the output 311 of the receiver wavelength division multiplexer 414 being the first output of the second WADM 208. Furthermore, the second WADM includes a second wavelength division multiplexer 416 having W single-wavelength inputs 417, each corresponding to a respective one of the W wavelengths, and an output 312 coupled to the segment of the second network optical fiber 212 leaving the network node 101. The second wavelength division multiplexer 416 multiplexes signals received by respective ones of the single-wavelength inputs 417 and provides corresponding WDM signals to the segment of the second network optical fiber 212 leaving the network node 101, the output 312 of the second wavelength division multiplexer 416 being the second output of the second WADM 208. The second WADM 208 further comprises a second group of W wavelength-non-selective switches 418 each corresponding to a respective one of the W wavelengths. Each one of the second group of switches 418 has a first input 419, a second input 420, a first output 421 and a second output 422. Each one of the second group of switches 418 has a bar state, in which a signal received at its first input 419 is provided at its first output 421, and a signal received at its second input 420 is provided at its second output 422. Each one of the second group of switches 418 has a cross state, in which a signal received at its first input 419 is provided at its second output 422, and a signal received at its second input 420 is provided at its first output 421. The first input 419 of each one of the second group of switches 418 is coupled to the first output 410 of a respective one of the first group of switches 407 corresponding to the same wavelength, the first outputs 410 of the first group of switches 407 being collectively the first output 307 of the first WADM 207 and the first inputs 419 of the second group of switches 418 being collectively the first input 309 of the second WADM 208. The second input 420 of each one of the second group of switches 418 is coupled to a respective one of the single-wavelength outputs 413 of the second wavelength division demultiplexer 412 corresponding to the same wavelength as the switch coupled thereto. The first output 421 of each one of the second group of switches 418 is coupled to a respective one of the single-wavelength inputs 415 of the receiver wavelength division multiplexer 414 corresponding to the same wavelength as the switch coupled thereto. The second output 422 of each one of the second group of switches 418 is coupled to a respective one of the single-wavelength inputs 417 of the second wavelength division multiplexer 416 corresponding to the same wavelength as the switch coupled thereto.

For each one of the first group of switches 407 of the first WADM 207 corresponding to a respective one of the W wavelengths, λ, where λ is an arbitrary one of the W wavelengths, being in the bar state, and an individual one of the second group of switches 418 of the second WADM corresponding to the same wavelength λ being in the bar state, a signal having wavelength λ on the segment of the first network optical fiber 209 entering the network node 101 passes undisturbed through the network node to the segment of the first network optical fiber 210 leaving the network node, and a signal having wavelength λ on the segment of the second network optical fiber 211 entering the network node also passes undisturbed through the network node to the segment of the second network optical fiber 212 leaving the network node. For each one of the first group of switches 407 of the first WADM 207 corresponding to a respective one of the W wavelengths, λ, being in the bar state, and an individual one of the second group of switches 418 of the second WADM 208 corresponding to the same wavelength λ being in the cross state, a signal having wavelength λ on the segment of the first network optical fiber 209 entering the network node 101 passes undisturbed through the network node to the segment of the first network optical fiber 210 leaving the network node, but a signal having wavelength λ carried on the segment of the second network optical fiber 211 entering the network node is routed via the second wavelength demultiplexer 412, the one of the second groups of switches 418 corresponding to wavelength λ, the receiver wavelength division multiplexer 414 and the receiver access fiber 301 to the array of receiving elements 303 in the network access station 102, thereby dropping that signal from the second network optical fiber. At the same time a signal having wavelength λ provided by the array of transmitting elements 304 of the network access station 102 is routed via the transmitter access fiber 302, the transmitter wavelength division demultiplexer 403, the one of the first group of switches 407 corresponding to wavelength λ, the one of the second group of switches 418 corresponding to wavelength λ and the second wavelength division multiplexer 416 to the segment of the second network optical fiber 212 leaving the network node 101, thereby adding a signal having wavelength λ to the second network optical fiber. Conversely, for each one of the first group of switches 407 of the first WADM 207 corresponding to a respective one of the W wavelengths, λ, being in the cross state, and an individual one of the second group of switches 418 corresponding to the same wavelength λ being in the bar state, a signal having wavelength λ on the segment of the second network optical fiber 211 entering the network node 101 passes through the network node undisturbed to the segment of the second network optical fiber 212 leaving the network node, but a signal having wavelength λ on the segment of the first network optical fiber 209 entering the network node 101 is routed via the first wavelength division demultiplexer 401, the one of the first group of switches 407 corresponding to wavelength λ, the one of the second group of switches 418 corresponding to wavelength λ, the receiver wavelength division multiplexer 414 and the receiver access fiber 301 to the array of receiving elements 303 of the network access station 102, thereby dropping that signal from the first network optical fiber. At the same time a signal having wavelength λ provided by the array of transmitting elements 304 of the network access station 102 is provided via the transmitter access fiber 302, the transmitter wavelength division demultiplexer 403, the one of the first group of switches 407 corresponding to wavelength λ and the first wavelength division multiplexer 405 to the segment of the first network optical fiber 210 leaving the network node, thereby adding a signal of wavelength λ to the first network optical fiber. Although the single access fiber coupled to the receiver is particularly well adapted to the use of an integrated array of receiving elements, which accept a single fiber input, the fiber could just as well feed an array of separate receiving elements, if a passive splitter or demultiplexer is included in the receiver to couple the single fiber to the W receiving elements. Similarly, an integrated array of transmitting elements is particularly well suited to be coupled to the single access fiber coupled to the transmitter. However, a passive combiner or multiplexer may be included in a transmitter to couple separate transmitting elements to the single fiber.

The components that may be used to construct the WADMs 207 and 208 in the exemplary embodiment of FIG. 4 are known in the art. For example, construction of the 2×2 non-wavelength-selective switches 407 and 418 may be as described in H. Kogelnik et al., "Switched Directional Couplers with Alternating Δβ," IEEE Journal of Quantum Electronics, Vol. QE-12, No. 7, pp. 396–401, July 1976. An example of the construction of the wavelength division demultiplexers 401, 403 and 412 is described in A. M. Vengsarkar et al., "Long-Period Fiber Gratings as Band-Rejection Filters," Journal of Lightwave Technology, Vol. 14, No. 1, pp. 58–65, January 1996. An example of the construction of the wavelength division multiplexers 405, 414 and 416 is described in M. A. Scobey et al., "Passive DWDM Components Using MicroPlasma® Optical Interference Filters," OFC '96 Technical Digest, pp. 242–243. The H. Kogelnik et al. article, the A. M. Vengsarkar et al. article and the M. A. Scobey et al. article are incorporated herein by reference.

Figure 5:
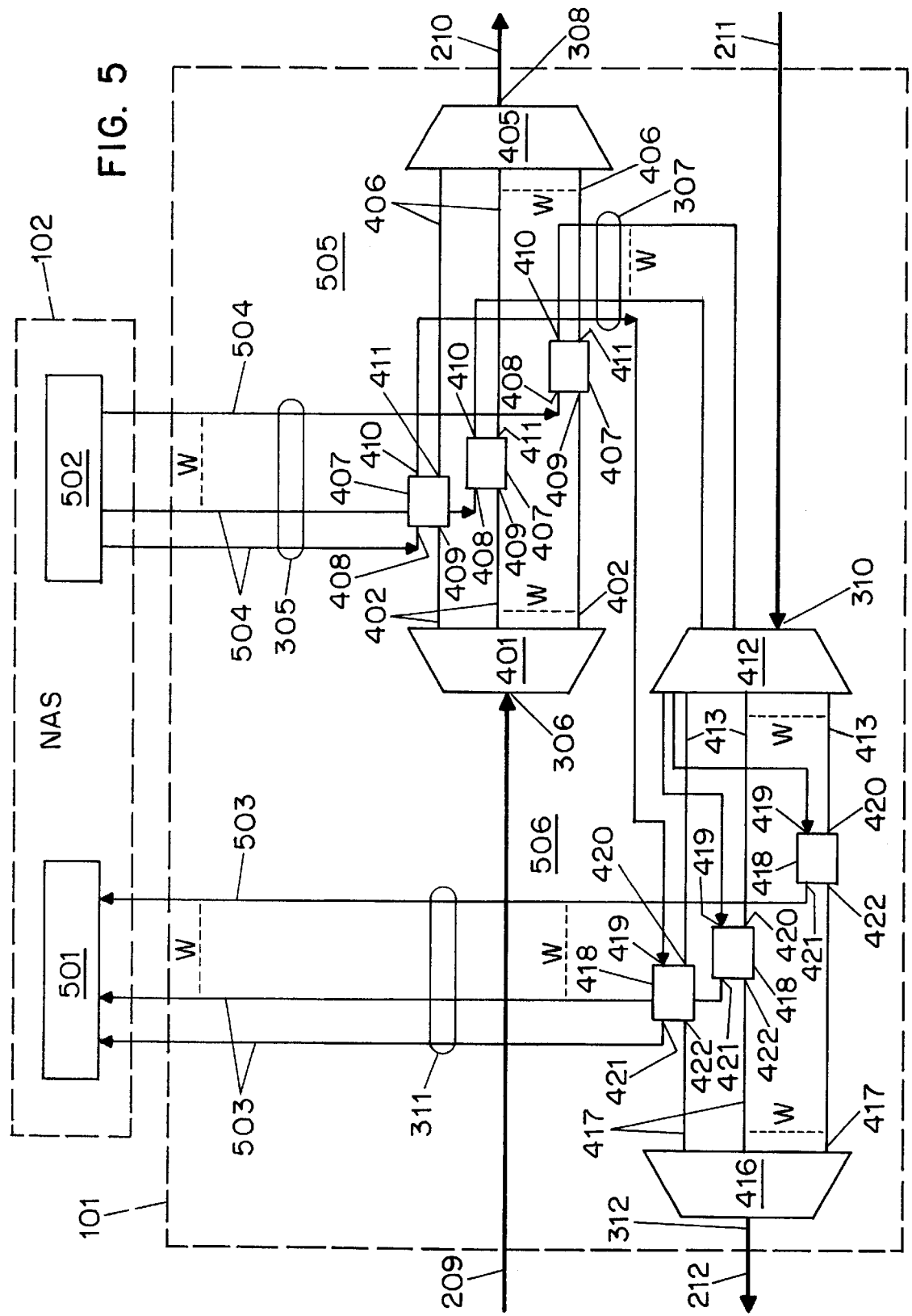
FIG. 5 is a schematic diagram of an implementation of the system of FIG. 3 according to another exemplary embodiment of the present invention.

Referring now to FIG. 5, there is shown a schematic diagram of a further exemplary embodiment of a system for accessing a wavelength-division-multiplexed, bidirectional optical fiber ring network. As in the exemplary embodiment of FIG. 4, the ring network has a capability of carrying W signals in each direction, each of the W signals having a respective one of W distinct wavelengths. The embodiment of FIG. 5 differs from that of FIG. 4 in that the receiver 501 of the network access station 102 consists of W individual receiving elements (e.g., semiconductor photodetectors) each for receiving signals having a respective one of the W wavelengths and being coupled to the network node 101 through an individual one of W single-wavelength receiver access fibers 503. The W receiver access fibers 503 each correspond to a respective one of the W wavelengths and provide signals having the corresponding wavelength to the receiving element for receiving signals having the corresponding wavelength. The transmitter 502 of the network access station 102 consists of W transmitting elements (e.g., semiconductor light-emitting diodes or lasers) each for providing signals having a respective one of the W wavelengths and being coupled to the network node 101 through an individual one of W single-wavelength transmitter access fibers 504. The W transmitter access fibers 504 each correspond to a respective one of the W wavelengths and carry signals having the corresponding wavelength provided by the transmitting element to which the fiber is coupled. The network access node in the system of FIG. 5 is similar to that of FIG. 4 except that the transmitter wavelength division demultiplexer 403 is eliminated from the first WADM 505, and the W single-wavelength transmitter access fibers are coupled directly to the first inputs 408 of respective ones of the first group of switches 407. In the embodiment of FIG. 5, the first inputs 408 of the first group of switches 407 are collectively the first input 305 of the first WADM 505. Furthermore, the second WADM 506 of the embodiment of FIG. 5 differs from that of the embodiment of FIG. 4 in that the receiver wavelength division multiplexer 414 in the embodiment of FIG. 4 is eliminated, and the W single-wavelength receiver access fibers 503 are coupled directly to the first outputs 421 of respective ones of the second group of switches 418. The operation of the exemplary embodiment of FIG. 5 is essentially identical to that of FIG. 4. For each one of the first group of switches 407 in the first WADM 505 corresponding to a respective one of the W wavelengths, λ, being in the bar state, and an individual one of the second group of switches 418 of the second WADM 506 corresponding to the same wavelength λ being in the bar state, a signal having wavelength λ on the segment of the first network fiber 209 entering the network node 101 passes through the network node undisturbed to the segment of the first network optical fiber 210 leaving the network node, and a signal having wavelength λ on the segment of the second network optical fiber 211 entering the network node passes through the network node undisturbed to the segment of the second network optical fiber 212 leaving the network node. For each one of the first group of switches 407 of the first WADM 505 corresponding to a respective one of the W wavelengths, λ, being in the bar state and an individual one of the second group of switches 418 of the second WADM 506 corresponding to the same wavelength λ being in the cross state, a signal having wavelength λ on the segment of the first network optical fiber 209 entering the network node 101 passes through the network node undisturbed to the segment of the first network optical fiber 210 leaving the network node. However, a signal on the segment of the second network optical fiber 211 entering the network node is routed via the second wavelength demultiplexer 412, the one of the second group of switches 418 corresponding to the wavelength λ and the one of the single-wavelength receiver access fibers 503 corresponding to wavelength λ to the one of the receiving elements 501 in the network access station 102 for receiving signals having the wavelength λ, thereby dropping that signal from the second network optical fiber. At the same time a respective one of the transmitting elements 502 of the network access station 102 provides a signal having wavelength λ via the one of the transmitter access fibers 504 corresponding to the wavelength λ, the one of the first group of switches 407 of the first WADM 505 corresponding to wavelength λ, the one of the second group of switches 418 of the second WADM 506 corresponding to wavelength λ and the wavelength division multiplexer 416 to the segment of the second network optical fiber 212 leaving the network node, thereby adding the signal provided by the respective one of the transmitting elements 502 to the second network optical fiber. For each one of the first group of switches 407 of the first WADM 505 corresponding to a respective one of the W wavelengths, λ, being the cross state and an individual one of the second group of switches 418 of the second WADM 506 corresponding to the same wavelength λ being in the bar state, a signal having wavelength λ on the segment of the second network optical fiber 211 entering the network node 101 passes through the network node undisturbed to the segment of the second network fiber 212 leaving the network node. However, a signal having wavelength λ on the segment of the first network optical fiber 209 entering the network node 101 is routed through the first wavelength division demultiplexer 401, the one of the first group of switches 407 corresponding to wavelength λ, the one of the second group of switches 418 corresponding to wavelength λ and the one of the single-wavelength receiver access fibers 503 corresponding to the wavelength λ to the one of the receiving elements 501 for receiving signals having wavelength λ, thereby dropping that signal from the first network optical fiber. At the same time a respective one of the transmitting elements 502 of the network access station 102 provides a signal having wavelength λ, which is routed through the one of the single-wavelength transmitter access fibers 504 corresponding to wavelength λ, the one of the first group of switches 407 corresponding to wavelength λ and the first wavelength division multiplexer 405 to the segment of the first network optical fiber 210 leaving the network node, thereby adding the signal provided by the respective one of the transmitting elements to the first network optical fiber.

While the present invention has been particularly described with reference exemplary embodiments thereof, it will be understood by those skilled in the art that various modifications and alterations may be made without departing from the spirit and scope of the invention, the scope of the invention being defined by the appended claims.

What is claimed is:

1. A system for accessing a WDM bidirectional optical fiber ring network having a first network fiber for carrying WDM signals in a first direction and a second network fiber for carrying WDM signals in a second direction, each of the first and second network fibers for carrying up to W WDM signals each having a respective one of W distinct wavelengths, where W is a positive integer, the system comprising a network node coupled to a network access station having a transmitter and a receiver through transmitter access fiber means and receiver access fiber means, respectively, the transmitter for providing signals having respective ones of the W wavelengths, the receiver for receiving signals having respective ones of the W wavelengths, the network node intersecting the first and second network fibers and comprising a first and a second WADM each having a first input, a second input, a first output and a second output, for each one of the W wavelengths, λ, each of the first and second WADMs has a bar state, in which a signal having the wavelength λ received at the first input of the WADM is provided to the first output of the WADM, and a signal having the wavelength λ received at the second input of the WADM is provided at the second output of the WADM, for each one of the W wavelengths, λ, each one of the first and second WADMs has a cross state, in which a signal having the wavelength λ received at the first input of the WADM is provided at the second output of the WADM and a signal having the wavelength λ received at the second input of the WADM is provided at the first output of the WADM, wherein the first input of the first WADM is coupled to the transmitter access fiber means; the second input of the first WADM being coupled to receive signals on the first network fiber entering the network node; the first output of the first WADM is coupled to the first input of the second WADM; the second output-of the first WADM is coupled to provide signals on the first network fiber leaving the network node; the second input-of the second WADM is coupled to receive signals on the second network fiber entering the network node; the first output of the second WADM is coupled to the receiver access fiber means; and the second output of the second WADM being coupled to provide signals on the second network fiber leaving the network node, such that when both the first and second WADMs are in the bar state for the wavelength λ, a signal having the wavelength λ on the first network fiber entering the network node passes through the network node unchanged to the first network fiber leaving the network node, and a signal having the wavelength λ on the second network fiber entering the network node passes through the network node unchanged to the second network fiber leaving the network node; such that when for the wavelength λ the first WADM is in the cross state and the second WADM is in the bar state, a signal having the wavelength λ on the first network fiber entering the network node is routed to the receiver of the network access station, and a signal having the wavelength λ provided by the transmitter of the network access station is routed to the first network fiber leaving the network node, a signal having the wavelength λ on the second network fiber entering the network node passing through the network node unchanged to the second network fiber leaving the network node; and such that when for the wavelength λ the first WADM is in the bar state and the second WADM is in the cross state, a signal having the wavelength λ on the second network fiber entering the network node is routed to the receiver of the network access station, and a signal having the wavelength λ provided by the transmitter of the network access station is routed to the second network optical fiber leaving the network node, a signal having the wavelength λ on the first network fiber entering the network node passing through the network node unchanged to the first network fiber leaving the network node.

2. The system of claim 1, wherein the transmitter of the network access station comprises a transmitting element array for providing signals having respective ones of the W wavelengths; the transmitter access fiber means comprises a transmitter access fiber coupled to the transmitting element array for providing to the network node signals having respective ones of the W wavelength provided by the transmitting element array; the receiver of the network access station comprises a receiving element array for receiving signals having respective ones of the W wavelengths; and the receiver access fiber means comprises a receiver access fiber for providing WDM signals having respective ones of the W wavelengths to the receiving element array, wherein each one of the first and second WADMs comprises a multiwavelength switch having a first input serving as first input of the respective WADM, a second input serving as the second input of the respective WADM, a first output serving as the first output of the respective WADM and a second output serving as the second output of the respective WADM, and wherein for each one of the W wavelengths, λ, the multiwavelength switch having a bar state, in which a signal having the wavelength λ received by the first input of the switch is provided at the first output of the switch, and a signal having the wavelength λ received by the second input of the switch is provided at the second output of the switch; and for each one of the W wavelengths, λ, the multiwavelength switch has a cross state, in which a signal having the wavelength λ received by the first input of the switch is provided at the second output of the switch and a signal having the wavelength λ received by the second input of the switch is provided at the first output of the switch.

3. The system of claim 1, wherein the transmitter of the network access station comprises a transmitting element array for providing signals having respective ones of the W wavelengths, and the transmitter access fiber means comprises a transmitter access fiber coupled to the transmitting element array for providing to the network node WDM signals having respective ones of the wavelengths provided by the transmitting element array; and the receiver of the network access station comprises a receiving element array for receiving signals having respective ones of the W wavelengths, and the receiver access fiber means comprises a receiver access fiber for providing to the receiving element array WDM signals having respective ones of the W wavelengths, wherein the first WADM comprises:

a first wavelength division demultiplexer having an input coupled to receive WDM signals on the first network fiber entering the network node and having W single-wavelength outputs each corresponding to a respective one of the W wavelengths, individual ones of the W single-wavelength outputs each providing a demultiplexed one of the WDM signals on the first network fiber entering the network node having a wavelength corresponding to the output providing the demutiplexed signal, the input of the first wavelength division demultiplexer being the second input of the first WADM;

a first group of W switches, each corresponding to a respective one of the W wavelengths and having a first input, a second input, a first output and a second output, each one of the switches of the first group having a bar state, in which a signal received by the first input of the switch is provided at the first output of the switch and a signal received by the second input of the switch is provided by the second output of the switch, each one of the switches of the first group having a cross state, in which a signal received by the first input of the switch is provided at the second output of the switch and a signal received by the second input of the switch is provided at the first output of the switch, the second input of each one of the switches of the first group being coupled to receive a respective one of the W outputs of the first demultiplexer corresponding to the same wavelength as the switch coupled thereto;

a first wavelength division multiplexer having W single-wavelength inputs each corresponding to a respective one of the W wavelengths and being coupled to the second output of a respective one of the first group of switches corresponding to the same wavelength as the first multiplexer input coupled thereto, and having an output coupled to the first network fiber leaving the network node, the first wavelength division multiplexer multiplexing signals provided by the second outputs of respective ones of the first group of switches to provide at the output thereof corresponding WDM signals to be carried on the first network optical fiber leaving the network node, the output of the first wavelength division multiplexer being the second output of the first WADM; and a transmitter wavelength division demultiplexer having an input coupled to the transmitter access fiber to receive WDM signals provided by the transmitting element array of the network access station and having W outputs each corresponding to a respective one of the W wavelengths for providing a demultiplexed one of the signals provided by the transmitting element array having a wavelength corresponding to the output providing the demultiplexed signal, each one of the outputs of the transmitter wavelength division demultiplexer being provided to the first input of a respective one of the first group of switches corresponding to the same wavelength as the output coupled thereto, the input of the transmitter wavelength demultiplexer being the first input of the first WADM, wherein the second WADM comprises:

a second wavelength division demultiplexer having an input coupled to receive WDM signals on the second network optical fiber entering the network node and having W single-wavelength outputs each corresponding to a respective one of the W wavelengths, individual ones of the W single-wavelength outputs each providing a demultiplexed one of the signals carried on the second network fiber entering the network node having a wavelength corresponding to the output providing the demultiplexed signal, the input of the second wavelength division demultiplexer being the second input of the second WADM;

a second group of W switches each corresponding to a respective one of the W wavelengths and having a first input, a second input, a first output and a second output, each one of the second group of switches having a bar state, in which a signal received by the first input of the switch is provided at the first output of the switch and a signal received by the second input of the switch is provided at the second output of the switch, each one of the second group of switches having a cross state, in which a signal received by the first input of the switch is provided at the second output of the switch and a signal received by the second input of the switch is provided at the first output of the switch, the second input of each one of the second group of switches being coupled to receive a respective one of the outputs of the second wavelength division demultiplexer corresponding to the same wavelength as the switch coupled thereto, the first input of each one of the second group of switches being coupled to receive the first output of a respective one of the first group of switches of the first WADM corresponding to the same wavelength, the first outputs of the first group of switches being collectively the first output of the first WADM, and the first inputs of the second group of switches being collectively the first input of the second WADM;

a second wavelength division multiplexer having W single-wavelength inputs each corresponding to a respective one of the W wavelengths and being coupled to the second output of a respective one of the second group of switches corresponding to the same wavelength as the second multiplexer input coupled thereto, and having an output coupled to the second network fiber leaving the network node, the second wavelength division multiplexer for multiplexing signals provided at respective ones of the second outputs of the second group of switches to provide at the output thereof corresponding WDM signals on the second network optical fiber leaving the network node, the output of the second wavelength division multiplexer being the second output of the second WADM; and a receiver wavelength division multiplexer having W single-wavelength inputs each corresponding to a respective one of the W wavelengths and being coupled to receive the first output of a respective one of the second group of switches corresponding to the same wavelength as the receiver multiplexer input coupled thereto, and having an output coupled to the receiver access fiber, the receiver wavelength division multiplexer multiplexing signals provided at individual ones of the first outputs of the second group of switches to provide corresponding WDM signals on the receiver access fiber, the output of the receiver wavelength division multiplexer being the first output of the second WADM, such that when for each one of the first group of switches corresponding to a respective one of the W wavelengths, λ, and an individual one of the second group of switches corresponding to the same wavelength λ both are in the bar state, a signal having the wavelength λ on the first network fiber entering the network node passes through the network node unchanged to the first network fiber leaving the network node, and a signal having the wavelength λ on the second network fiber entering the network node passes through the network node unchanged to the second network fiber leaving the network node; such that when for each one of the first group of switches corresponding to a respective one of the W wavelengths, λ, is in the cross state and an individual one of the second group of switches corresponding to the same wavelength λ is in the bar state, a signal having one the wavelengths λ on the first network fiber entering the network node is routed to the receiving element array of the network access station, and a signal having the wavelength λ provided by the transmitting element array of the network access station is routed to the first network fiber leaving the network node, a signal having the wavelength λ on the second network fiber entering the network node passing through the network node unchanged to the second network fiber leaving the network node; and such that when for each one of the first group of switches corresponding to a different one of the W wavelengths, λ, is in the bar state and an individual one of the second group of switches corresponding to the same wavelength λ is in the cross state, a signal having the wavelength λ on the second network fiber entering the network node is routed to the receiving element array of the network access station, and a signal having the wavelength λ provided by the transmitting element array of the network access station is routed to the second network fiber leaving the network node, a signal having the wavelength λ on the first network fiber entering the network node passing through the network node unchanged to the first network fiber leaving the network node.

4. The system of claim 1, wherein the transmitter of the network access station comprises W individual transmitting elements each for providing signals having a respective one of the W wavelengths; the transmitter access fiber means comprises W individual transmitter access fibers each corresponding to a respective one of the W wavelengths and being coupled to an individual one of the transmitting elements for providing signals having the corresponding wavelength to the network node; the receiver of the network access station comprises W individual receiving elements each for receiving signals having a respective one of the W wavelengths; and the receiver access fiber means comprises W individual receiver fibers each corresponding to a respective one of the W wavelengths and being coupled to a receiving element for receiving signals having the corresponding wavelength, wherein the first WADM of the network node comprises:

a first wavelength division demultiplexer having an input coupled to receive WDM signals on the first network optical fiber entering the network node and W single-wavelength outputs each corresponding to a respective one of the W wavelengths, individual ones of the outputs of the first wavelength division demultiplexer each providing a demultiplexed one of the WDM signals on the first network optical fiber entering the network node having a wavelength corresponding to the output providing the demultiplexed signal, the input of the first wavelength division demultiplexer being the second input of the first WADM;

a first group of switches each one corresponding to a respective one of the W wavelengths and having a first input, a second input, a first output and a second output, each one of the first group of switches having a bar state, in which a signal received by the first input of the switch is provided at the first output of the switch and a signal received by the second input of the switch is provided at the second output of the switch, each one of the first group of switches having a cross state, in which a signal received by the first input of the switch is provided at the second output of the switch and a signal received by the second input of the switch is provided at the first output of the switch, the first input of each one of the first group of switches being coupled to a respective one of the W transmitter access fibers corresponding to the same wavelength as the switch being coupled thereto, the second input of each one of the first group of switches being coupled to a respective one of the W outputs of the first wavelength division demultiplexer corresponding to the same wavelength as the switch being coupled thereto, the first input of each one of the first group of switches being coupled to a respective one of the W transmitter access fibers corresponding to the same wavelength as the switch being coupled thereto, the first inputs of the first group of switches being collectively the first input of the first WADM; and a first wavelength division multiplexer having W single-wavelength inputs each corresponding to a respective one of the W wavelengths and being coupled to the second output of an individual one of the first group of switches corresponding to the same wavelength, and having an output coupled to the first network fiber leaving the network node, the first wavelength division multiplexer multiplexing single-wavelength signals provided at the second outputs of individual ones of the first group of switches to provide corresponding WDM signals on the first network optical fiber leaving the network node, the output of the first wavelength division multiplexer being the second output of the first WADM, wherein the second WADM of the network node comprises:

a second wavelength division demultiplexer having an input coupled to receive WDM signals on the second network optical fiber entering the network node and having W outputs each corresponding to a respective one of the W wavelengths, individual ones of the W outputs of the second wavelength division demultiplexer each providing a demultiplexed one of the WDM signals on the second fiber entering the network node having a wavelength corresponding to the output providing the demultiplexed signal, the input of the second wavelength division demultiplexer being the second input of the second WADM;

a second group of switches each corresponding to a respective one of the W wavelengths and having a first input, a second input, a first output and a second output, each one of the second group of switches having a bar state in which a signal received by the first input of the switch is provided at the first output of the switch and a signal received by the second input of the switch is provided at the second output of the switch, each one of the second group of switches having a cross state in which a signal received by the first input of the switch is provided at the second output of the switch and a signal received by the second input of the switch is provided at the first output of the switch, the first input of each one of the second group of switches being coupled to the first output of a respective one of the first group of switches in the first WADM corresponding to the same wavelength, the second input of each one of the second group of switches being coupled to a respective one of the W outputs of the second wavelength division demultiplexer corresponding to the same wavelength as the switch being coupled thereto, the first output of each one of the second group of switches being coupled to a respective one of the W receiver access fibers corresponding to same wavelength as the switch being coupled thereto, the first outputs of the first group of switches of the first WADM being collectively the first output of the first WADM, the first inputs of the second group of switches being collectively the first input of the second WADM, the first outputs of the second group of switches being collectively the first output of the second WADM; and a second wavelength division multiplexer having W inputs each corresponding to a respective one of the W wavelengths and being coupled to the second output of a respective one of the second group of switches corresponding to the same wavelength as the second multiplexer input coupled thereto, and having an output coupled to the second network fiber leaving the network node, the second wavelength division multiplexer multiplexing single-wavelength signals provided by the second outputs of respective ones the second group of switches to provide corresponding WDM signals on the second network optical fiber leaving the network node, and whereby for each one of the first group of switches corresponding to a respective one of the W wavelengths, $\lambda$, and an individual one of the second group of switches corresponding to the same wavelength $\lambda$ both being in the bar state, a signal having the wavelength $\lambda$ on the first network fiber entering the network node passes through the network node unchanged to the first network fiber leaving the network node and a signal having the wavelength $\lambda$ on the second network fiber entering the network node passes through the network node unchanged to the second network fiber leaving the network node; for each one of the first group of switches corresponding to a respective one of the W wavelengths, $\lambda$, being in the cross state and an individual one of the second group of switches corresponding to the same wavelength $\lambda$ being in the bar state, a signal having the wavelength $\lambda$ on the first network fiber entering the network node is routed to a respective one of the receiving elements for receiving signals having the wavelength $\lambda$, and a signal having the wavelength $\lambda$ provided by a respective one of the transmitting elements for providing signals of wavelength $\lambda$ is routed to the first network fiber leaving the network node, a signal having the wavelength $\lambda$ on the second network fiber entering the network node passing through the network node unchanged to the second network fiber leaving the network node; and for each one of the first group of switches corresponding to a respective one of the W wavelengths, $\lambda$, being in the bar state and an individual one of the second group of switches corresponding to the same wavelength $\lambda$ being in the cross state, a signal having the wavelength $\lambda$ on the second network fiber entering the network node is routed to a respective one of the receiving elements for receiving signals having the wavelength $\lambda$, and a signal having the wavelength $\lambda$ provided by a respective one of the transmitting elements for providing signals having the wavelength $\lambda$ is routed to the second network fiber leaving the network node, a signal having the wavelength $\lambda$ on the first network fiber entering the network node passing through the network node unchanged to the first network fiber leaving the network node.

* * * * *